United States Patent [19]

Ito et al.

[11] Patent Number: 4,874,495

[45] Date of Patent: Oct. 17, 1989

[54] APPARATUS FOR PRODUCING A FIBER AGGREGATE

[75] Inventors: Tomohito Ito, Ohbu; Renichi Isomura, Kariya; Hidetoshi Hirai, Ichinomiya; Fukuo Gomi, Nagoya, all of Japan

[73] Assignee: Kabushiki Kaisha Toyoda Jidoshokki Seisakusho, Kariya, Japan

[21] Appl. No.: 99,900

[22] Filed: Sep. 22, 1987

[30] Foreign Application Priority Data

Sep. 24, 1986 [JP] Japan ................... 61-225592
Mar. 11, 1987 [JP] Japan ................... 62-55799

[51] Int. Cl.$^4$ .................. C25D 17/10; C25D 9/00
[52] U.S. Cl. ...................... 204/212; 204/272; 204/276; 204/280; 204/284; 204/269; 204/225
[58] Field of Search ............... 204/272, 273, 276, 212, 204/240, 280, 284, 269, 289, 225

[56] References Cited

U.S. PATENT DOCUMENTS

| | | | |
|---|---|---|---|
| 1,059,071 | 4/1913 | Robinson | 204/273 |
| 2,640,026 | 5/1953 | Whittington | 204/272 |
| 3,012,923 | 12/1961 | Slayter | 156/30 |
| 3,073,732 | 1/1963 | Hunsdiecker | 154/43 |
| 3,497,419 | 2/1970 | Winer et al. | 162/192 |
| 3,843,756 | 10/1974 | Talbott et al. | 264/24 |
| 3,954,364 | 5/1976 | Talbott et al. | 425/174.8 E |
| 3,960,650 | 6/1976 | Parks et al. | 162/103 |
| 4,111,294 | 9/1978 | Carpenter et al. | 198/381 |
| 4,264,422 | 4/1981 | Funabashi et al. | 204/181 F |
| 4,432,716 | 2/1984 | Logan | 264/24 |

FOREIGN PATENT DOCUMENTS 1914316 10/1970 Fed. Rep. of Germany .
3016034 10/1980 Fed. Rep. of Germany .

Primary Examiner—Donald R. Valentine
Attorney, Agent, or Firm—Berman, Aisenberg & Platt

[57] ABSTRACT

A fiber aggregate in which many of the fibers are oriented in the tangent direction of the circumference satisfactorily can be produced by a process and an apparatus according to the present invention. The best feature of the present invention is the following arrangement for a plurality of electrodes used in a process and an apparatus according to the present invention. Vertically extending foil, net or needle-shaped electrodes for orienting the fibers electrostatically are disposed alternately along the circumference of the vertically cylindrical space so as to divide the vertically cylindrical space into equal parts. In addition to this arrangement, the plurality of electrodes may be rotated as well as moved vertically in order not to disturb the fiber aggregation. A fiber aggregate obtained by the present invention has an improved strength and anti-thermal properties.

9 Claims, 2 Drawing Sheets

APPARATUS FOR PRODUCING A FIBER AGGREGATE

BACKGROUND OF THE INVENTION

1. Field of the Invention

The present invention relates to a process for a producing fiber aggregate and an apparatus for producing the same, and more particularly, it relates to a process and an apparatus for obtaining an optimum cylindrical fiber aggregate, in which many of fibers are oriented in the tangent direction of the circumference, especially for the fiber reinforced metal application.

2. Description of the Prior Art

Conventionally, a fiber aggregate of short fibers or whiskers has been produced by the following processes:

A centrifugal forming process (Japanese published unexamined patent application No. 65200/1985) has been employed to form the fiber aggregate. According to the process, a fiber suspension is supplied in a porous cylindrical vessel having a lining of a filtration membrane, and the filtrate is dissipated by the centrifugal force to form a fiber aggregate having a hollow.

A suction forming process has been also employed to form the fiber aggregate. According to the process, a fiber suspension supplied in a cylinder is pressurized by a plunger while forcibly draining the filtrate via the filtering substance from the bottom of the cylinder.

However, the fiber aggregate obtained by the above forming processes have many of fibers oriented in two or three-dimensional direction, and the fiber volume ratio is low. Accordingly, it shows a very poor result in the fiber reinforced metal application aiming to improve the strength and control the thermal expansion.

SUMMARY OF THE INVENTION

The present invention is based on the following engineering idea to obtain a fiber aggregate in which many of fibers are one-dimensionally oriented:

A fiber suspension dispersing short fibers or whiskers in a dielectric fluid is poured in a space between a positive electrode and a negative electrode, across which a high voltage is applied, to orient the fibers. When the fiber suspension is poured into the space, the individual fibers in the dielectric fluid are so oriented as one of their ends pointing to the positive electrode and the other end pointing to the negative electrode. Then the electrostatically oriented fibers are aggregated while keeping the orientation.

However, many problems arises when applying such basic technology to an industrial operation.

For instance, when the fiber suspension is poured into an electric field generated among positive and negative electrodes disposed in parallel to orient the fibers electrostatically, a fiber aggregate is obtained in which many of the fibers are oriented in one-dimensional direction; i.e. linear direction. This fiber aggregate may be useful, but there are many column or cylinder-shaped functional parts requiring the application of fiber reinforced metal. The fiber aggregate having linearly oriented fibers does not meet the requirements of the column or cylinder-shaped functional parts.

It is an object of the present invention to obtain a cylindrical fiber aggregate in which many of non-continuous fibers are oriented in the tangent direction of the circumference.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
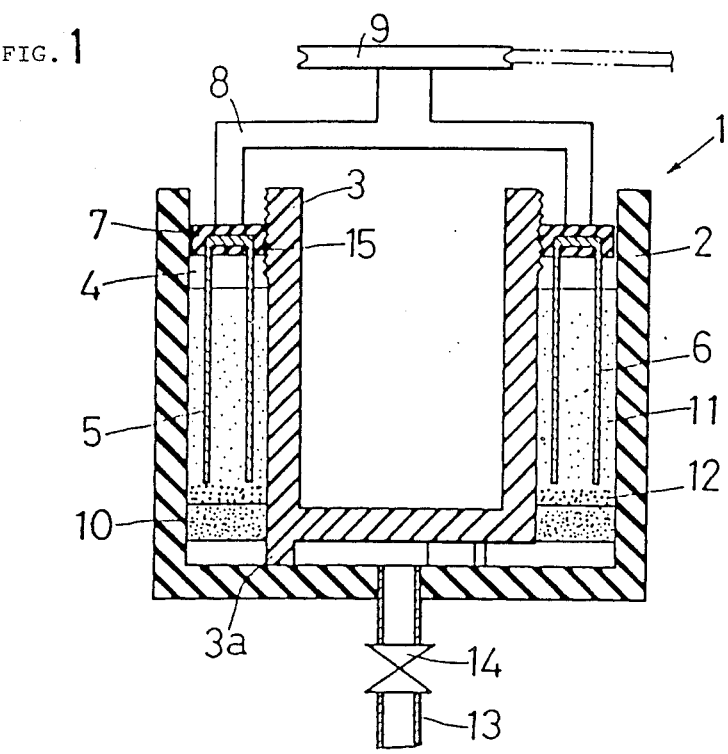
FIG. 1 is a schematic illustration of a preferred embodiment of an apparatus according to the present invention in section along line I—I of FIG. 2.

The present invention employs a novel process comprising the following steps to solve the aforementioned problems:

a dispersion step of dispersing fibers in the form of short fibers, whiskers, or a mixture thereof into a dielectric fluid;

an orientation step of placing said dielectric fluid containing said fibers dispersed therein having vertical cylindrical space in a positive electrode and negative electrode pairs disposed alternately in the radial direction of the circumference of the vertically cylindrical space between which a high voltage is applied, whereby causing individual fibers in the dielectric fluid to electrostatically orient in the tangent direction of the circumference; and an aggregating step of aggregating the electrostatically oriented fibers while keeping the oriented step.

Especially, the important feature of the present invention is the electrodes for orienting the fibers electrostatically. The electrodes are disposed in the radial direction of the circumference in the vertically cylindrical space, and are extending in the vertical direction as well. The quantity of poles are not specifically limited to a certain quantity, but the quantity of positive electrodes and the quantity of negative electrodes are equal, and the positive electrodes and negative electrodes are disposed alternately in the radial direction of the circumference. The most preferable arrangement is that the vertically cylindrical space is equally spaced in an even number quantity by the electrodes in the horizontal plane. In other words, the dimensions of the sector-shaped section spaces divided by the electrodes are approximately equal, so that the strength of each of the electric fields generated in the sections becomes uniform.

Those electrodes are preferably made into a foil-shape, a plural-wire-disposed-shape, a net-shape, or a combination thereof. It is preferable to form the electrodes as thin as possible since the electrodes are so disposed to separate the oriented fibers in the vertically cylindrical space. The electrodes in the plural-wire-disposed-shape are such that a plurality of thin wires are formed longitudinally with the predetermined space between each wire or wires are formed horizontally in the same manner as the longitudinally formed wires.

In addition, the lower portion of the vertically cylindrical space, i.e. The aforementioned electrodes disposed at a height corresponding to the accumulated height of sedimented fibers at least, should preferably by a comparatively sparse needle cable or net-shaped electrodes in order to reduce the separated portion of the oriented fibers.

In addition to the aforementioned steps; i.e. a dispersion step of dispersing fibers in the form of short fiber, whisker, or a mixture of thereof into a dielectric fluid;

an orientation step of placing said dielectric fluid containing said fibers dispersed therein having vertical cylindrical space in a positive electrode and negative electrode pairs disposed alternately in the radial direction of the circumference of the vertically cylindrical space between which a high voltage is applied, whereby causing individual fibers in the dielectric fluid to electrostatically orient in the tangent direction of the circumference; and an aggregating step of aggregating the electrostatically oriented fibers while keeping the oriented step, the present invention further employs the following engineering means:

an electrode rotating means for rotating the electrodes slowly around the center line of the vertically cylindrical space as the center axis, and an electrode position changing means for changing the positions of the electrodes relatively in sequence in relation to the longitudinal direction of the vertically cylindrical space to keep the clearance between the rim of the lower end of the electrodes and aggregated fiber layer at a predetermined value.

Especially, the important feature of the present invention is the electrodes for orienting the fibers electrostatically. The needle, net-shaped electrodes, or the electrodes of a combined shape thereof are disposed in the radial direction of the circumference in the vertically cylindrical space, and are extending in the vertical direction as well. The quantity of poles are not specifically limited to a certain quantity, but the quantity of positive electrodes and the quantity of negative electrodes are equal, and the positive electrodes and negative electrodes are disposed alternately in the circumferential direction. The most preferable arrangement is that the vertically cylindrical space is equally spaced in an even number quantity by the electrodes in the horizontal plane. In other words, the dimensions of the sector-shaped section spaces divided by the electrodes are approximately equal, so that the strength of each of the electric fields generated in the section becomes uniform.

Since the aforementioned electrodes are disposed to separate the oriented fibers in the vertically cylindrical space, they are rotated continuously of intermittently to displace their positions in the horizontal plane freely to avoid the separation of the oriented fibers and uneven fiber density in a molded body due to the fiber accumulation around the electrodes. At the same time, the electrodes are moved in the vertical direction to displace their positions in the longitudinal direction in the vertically cylindrical space in accordance with the accumulated height of the fiber layer, thus the interference between the rotating electrodes and the fiber layer can be avoided by keeping the clearance between the lower end rim of the rotating electrodes and the fiber layer accumulated sequentially.

In addition, the electrodes may not be rotated only in one direction, they may be rotated in both clockwise and counter clockwise direction within a predetermined rotary angle. The longitudinal movement of the electrodes in the vertically cylindrical space may be replaced with the movement of the vertically cylindrical space itself.

Further, the electrodes ascent in accordance with the accumulated height of the fiber layer to avoid the disturbance of the fiber layer aggregation bridged and sedimented on the filtering substance resulting from the interference of the rotating electrodes. Thus the lower end rim of the electrodes can always be kept from the fiber layer by a predetermined clearance.

The surface of the positive and negative electrodes may be covered with a diaphragm to avoid short-circuited fibers and control the turbulent flow of the fiber suspension. The diaphragm may be a filter paper, but it may preferably be an ion exchange membrane which avoids the turbulent flow of the filter suspension. If such is the case, the surface of the positive electrodes is covered with an anion exchange membrane, and the surface of the negative electrodes is covered with a cation exchange membrane. Thus the disturbance of the fiber suspension due to ions can be skillfully avoided, because the anion exchange membrane prevents the transmission or intrusion of cations, generated at the positive electrodes, into the fiber orientation area, and similarly the cation exchange membrane prevents the transmission or intrusion of anions, generated at the negative electrodes, into the fiber orientation area.

The production of a fiber aggregate starts with the preparation of a fiber suspension by dispersing fibers such as short fibers or whiskers in a dielectric liquid.

For the aforementioned fibers, all fibers come within the categories of the short fiber and whisker may be used. They are not limited in material so long as they are capable of electrostatic orientation in a dielectric liquid when they are poured as a fiber suspension into a predetermined electric field. The material of the fiber includes, for instance, alumina, silica, alumina-silica, beryllia, carbon, silicon carbide, silicon nitride, glass, and metals. Two or more of the aforementioned fibers may be mixed and used.

The dielectric fluid means a fluid which exhibits the dielectric property upon application of a voltage. Examples of the dielectric liquid include carbon tetrachloride, fluorine and chlorine-substituted hydrocarbons, n-hexane, and cyclohexane. Carbon tetrachloride is the most preferable dielectric liquid among them. Fluorine and chlorine-substituted hydrocarbons are preferable from the handling and safety view points. Further, it is preferable to add an appropriate amount of a nonionic surfactant to disperse the fibers in the dielectric fluid as evenly as possible.

The next step of the fiber aggregate production is the generation of an electric field among the plurality of positive and negative electrode pairs disposed alternately in the radial direction of circumference in the vertically cylindrical space. Then, the fiber suspension is poured into the electric field to orient fibers in the tangent direction of the circumference so that an end of fibers points to a positive electrode and the other end of fibers points to a negative electrode. And at the same time the fibers are sedimented while they are bridged.

The strength of the electric field generated upon the application of a voltage among the positive and negative electrodes is usually about 0.5 to 5 kv/cm. If the strength is approximately 0.2 kv/cm or less, the fibers are not satisfactorily oriented electrostatically. If the strength is about 10 kv/cm or more, the accuracy of the fiber orientation deteriorates due to the occurrence of the disturbance in the fiber suspension. The most preferable electric field strength is approximately 1 to 2 kv/cm. For the electric field, not only an electric field generated by a direct current but also an electric field generated by an alternate current may be used. However, the most preferable electric field strength depends on fibers used, the dielectric property of dielectric fluid used, and the thickness of fiber aggregate to be produced.

The fibers oriented as well as sedimented are aggregated at the lower part of the vertically cylindrical space sequentially. The pouring of the fiber suspension continues until the aggregate reaches a desired thickness. Approximately the same amount of liquid as the amount of the poured suspension is drained through the bottom of the vessel. When draining, it is important to take precautions against turbulent flow. It is preferred to drain the liquid naturally or by suction after the flow amount has been so controlled as to make flow free from the mechanical disturbance.

It is effective to drain the fluid via the filtering substance disposed at the bottom of the vertically cylindrical space to avoid fibers escaping and turbulent fluid as well as to control the flow amount. For the filtering substance, a porous ceramic may be used.

The cylindrical fiber aggregate thus aggregated is taken out of the vessel after the draining of the residual dielectric fluid has been completed. It is used as a fiber molded body for a functional part having a column or cylindrical shape made of a fiber reinforced metal.

The present invention employs a novel process comprising the following steps:

a dispersion step of dispersing fibers in the form of short fiber, whisker, or a mixture thereof into a dielectric fluid;

an orientation step of placing said dielectric fluid containing said fibers dispersed therein having vertical cylindrical space in a positive electrode and negative electrode pairs disposed alternately in the radial direction of the circumference of the vertically cylindrical space between which a high voltage is applied, whereby causing individual fibers in the dielectric fluid to electrostatically orient in the tangent direction of the circumference; and an aggregating step of aggregating the electrostatically oriented fibers while keeping the oriented step.

Hence the following excellent advantages are offered when it is applied to the production of fiber reinforced metal molded body for a functional part having a column or cylinder shape:

(I) Since many of the non-continuous fibers in the fiber reinforced metal are oriented in the tangent direction of the circumference satisfactorily, the fibers endure the stress in the tangent direction of the circumference securely. As a result, the strength of the fiber reinforced metal increases sharply. Furthermore, since the direction of the fiber orientation and the direction of the thermal expansion agree each other, the thermal expansion of fiber reinforced metal can be controlled effectively.

(2) A fiber reinforced metal with a continuous fiber wound in the circumferential direction thereof is weak against a thermal cycle. It exhibits fiber peeling-off from matrix metal and the fiber deformation resulting from the thermal expansion difference between the fiber and matrix metal. On the other hand, the fiber reinforced metal with non-continuous fibers oriented in the tangent direction of the circumference does not exhibit such a problem, because the matrix metal around the end surfaces of the fibers absorbs the strain resulting from the thermal expansion difference between the fiber and matrix metal.

(3) The fiber reinforced metal with non-continuous fibers oriented in the tangent direction of the circumference, in which the aforementioned stress direction and fiber orientation direction agree each other, exhibits far better strength and anti-thermal expansion properties than fiber reinforced metal with randomly oriented fibers in two or three-dimensions.

Further, since the apparatus for producing the fiber aggregate has a thin foil-shaped, a thin net-shaped or needle cable-shaped electrodes disposed in the radial direction of the circumference in the vertically cylindrical space in order to avoid the separation of the fibers oriented in the tangent direction of the circumference as much as possible, it remarkably affects the improvement of the fiber reinforced metal strength.

Moreover, the process for producing a fiber aggregate according to the present invention employs the following additional engineering means:

electrode rotating means for rotating the electrodes in the vertically cylindrical space, and electrode position changing means, which works simultaneously with the electrode rotating means, for changing the positions of the electrodes in the longitudinal direction of the vertically cylindrical space in accordance with the accumlated height of the aggregate fiber layer, in addition to the following aforementioned steps:

a dispersion step of dispersing fibers in the form of short fiber, whisker, or a mixture thereof into a dielectric fluid;

an orientation step of placing said dielectric fluid containing said fibers dispersed therein having vertical cylindrical space in a positive electrode and negative electrode pairs disposed alternately in the radial direction of the circumference of the vertically cylindrical space between which a high voltage is applied, whereby causing individual fibers in the dielectric fluid to electrostatically orient in the tangent direction of the circumference; and an aggregating step of aggregating the electrostatically oriented fibers while maintaining the orientation step.

Therefore the following excellent advantage of combining the aforementioned advantages (2) and (3) is offered when it is applied to the production of fiber reinforced metal molded body for a functional part having a column or cylinder shape.

Since many of the non-continuous fibers in the fiber reinforced metal are oriented in the tangent direction of the circumference satisfactorily, and since no oriented fibers are separated and localized, the fibers endure the stress in the tangent direction of the circumference securely. As a result, the strength of the fiber reinforced metal increases sharply. Furthermore, since the direction of the fiber orientation and the direction of the thermal expansion are substantially the same the thermal expansion of fiber reinforced metal can be controlled effectively.

Having generally described this invention, a further understanding can be obtained by reference to certain specific examples which are provided herein for purposes of illustration only and are not intended to be limiting unless otherwise specified.

FIRST PREFERRED EMBODIMENT

Figure 2:
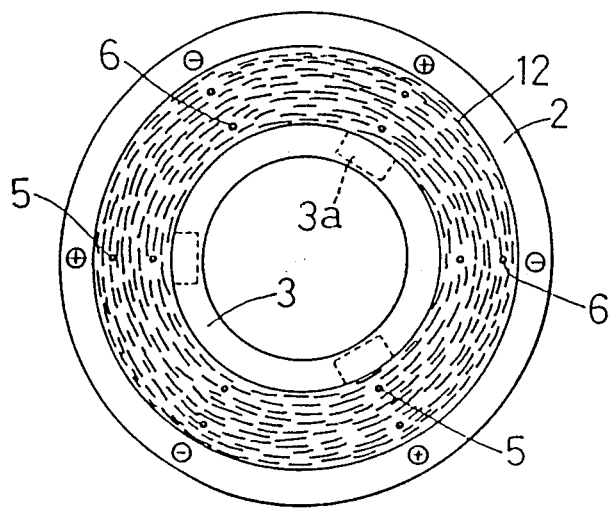
FIG. 2 is a plan view of a preferred embodiment of an apparatus according to the present invention.

When embodying a process for producing a fiber aggregate according to the present invention, an apparatus schematically illustrated in FIG. 1 and FIG. 2 is used. In the figures, 1 designates a vessel with a bottom having an outer cylinder 1a. An inner cylinder 2 disposed in concentricity with the outer cylinder 1a is supported by, for instance, three legs 2a on the inner bottom surface of the vessel 1 with a bottom. A vertically cylindrical space 3 as the fiber orientation area is formed between the outer cylinder 1a and inner cylinder 2. In the vertically cylindrical space 3, for instance, three pairs of positive electrodes 4 and negative electrodes 5 are so disposed alternately in the radial direction of the circumference as to divide the vertically cylindrical space 3 into six equal parts. The positive electrodes 4 and negative electrodes 5 are foil or net-shaped, and extend vertically.

A lower portion of the positive electrodes 4 and negative electrodes 5, namely the portion corresponding to the aggregated height of the sedimented and aggregated fibers at least, is a comparatively sparse needle cable shape 6. The lower end of the positive electrodes 4 and negative electrodes 5 are joined to a filtering substance 7 disposed all over the lower part of vertically cylindrical space 3. The upper portion of the positive electrodes 4 and negative electrodes 5 are supported by retainers (not shown) in a vertically pulled state. The surface of the positive electrodes 4 is covered with an anion exchange membrane (not shown), and the surface of the negative electrodes 5 is covered with a cation exchange menbrane (not shown). The positive electrodes 4 and negative electrodes 5 are connected to a voltage applying apparatus (not shown) for generating a predetermined electric field between the positive electrodes 4 and negative electrodes 5.

A draining means comprising a pipe 8, connectable to a suction apparatus, and a cock 9 is disposed on the bottom of vessel 1.

In this apparatus, the positive electrode 4 and negative electrode 5 are a foil shape having a width of 15 mm, and disposed alternately at regular intervals. The total quantity of electrodes used is three for each electrode, and the interval between the neighboring electrodes is 55 mm in the middle section.

Alumina short fibers (average fiber diameter: 3 μm, avarage fiber length: 10 to 5000 μm) without surface treatment and a very small amount of nonionic surfactant are added to a dielectric liquid comprising carbon tetrachloride. The mixture is stirred to obtain a fiber suspension in which the fibers are dispersed.

An electric field of approximately 1 kv/cm electric field strength is generated between the positive and negative electrodes of the apparatus. And the fiber suspension is poured from the top of the vertically cylindrical space 3 into all the sections divided by the positive electrodes 4 and negative electrodes 5.

The poured fibers are polarized dielectrically, and oriented in the tangent direction of the circumference electrostatically. Then many of them are bridged, and their masses increase. And then they are sedimented while maintaining the orientation of the tangent direction of the circumference.

The oriented and bridged fibers 10 are aggregated sequentially on the filtering substance 7 by draining the filtrate through the pipe 8. The filtrate draining is done simultaneously with the fiber suspension pouring. After the fiber aggregate 11 having a predetermined thickness is formed, the residual liquid is drained to take out the fiber aggregate 11.

The fiber aggregate 11 has a cylindrical shape, and many of the fibers are oriented in the tangent direction of the circumference satisfactorily. The inner circumference section of the fiber aggregate 11 has a slightly larger fiber volume ration than that of the outer circumference section of the fiber aggregate 11. However, a fiber aggregate having almost uniform fiber volume ratio can be formed by supplying a fiber suspension with a high concentration at the outer circumference area of the vertically cylindrical space In this preferred embodiment, no turbulent flow due to the liquid draining arises, because the filtering substance 7 is disposed all over the lower part of vertically cylindrical space 3. Thus it is possible to produce a fiber aggregate in which many of fibers are oriented in the tangent direction of the circumference extremely well.

As this fiber aggregate has many of the fibers satisfactorily oriented in the tangent direction of the circumference, the fiber reinforced metal shows greater strength and less thermal expansion when the fiber aggregate is used in the fiber reinforced metal. Accordingly, this fiber aggregate is applied, for instance, to various types of pistons effectively.

SECOND PREFERRED EMBODIMENT

This preferred embodiment has the same arrangement as the first preferred embodiment other than described below:

This preferred embodiment employs two net-shaped positive electrodes 4 and two net-shaped negative electrodes 5 disposed at regular intervals, a fluorine and chlorine-substituted hydrocarbon as the dielectric liquid, and silicon carbide whiskers (average fiber diameter: 0.7 μm, average fiber length: 50 μm), and an electric field of 1.5 kv/cm electric field strength. The mesh of the net is #4 class.

A fiber aggregate in which many of the fibers are oriented in the tangent direction of the circumference satisfactorily can also be obtained in this preferred embodiment.

THIRD PREFERRED EMBODIMENT

Figure 3:
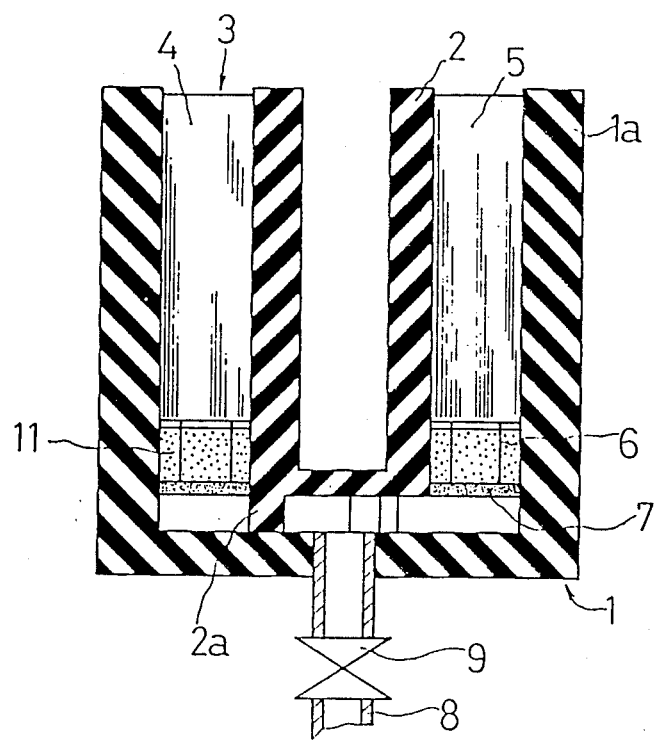
FIG. 3 is a schematic illustration of a preferred embodiment of an apparatus according to the present invention in section.
Figure 4:
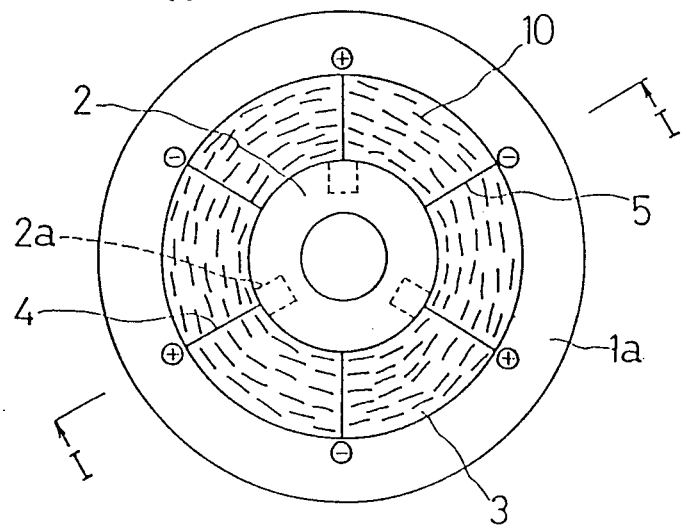
FIG. 4 is a partially abbreviated plan view of a preferred embodiment of an apparatus according to the present invention.

When embodying a process for producing a fiber aggregate according to the present invention, an apparatus schematically illustrated in FIG. 3 and FIG. 4 is used. In the figures, 21 designates a vessel with a closed base having an outer cylinder 22. An inner cylinder 23 disposed in concentricity with the outer cylinder 22 is supported by, for instance, three legs 23a on the inner bottom surface of vessel 21. An annular space 24 as the fiber orientation area is formed between the outer cylinder 22 and inner cylinder 23. In the annular space 24, for instance, three pairs of positive electrodes 25 and negative electrodes 26 are so disposed alternately in the radial direction of the circumference as to divide the vertically cylindrical space 25 into six equal parts. The positive electrodes 25 and negative electrodes 26 are needle-shaped electrodes, and extend vertically.

The upper ends of the positive electrodes 25 and negative electrodes 26 are embedded in a ring-shaped insulating support member 27. The support member 27 is joined to a rotary driving system via a connecting member 28 and a pulley 29. The support member 27 engages with the inner cylinder 23 in threaded portion 35, so that it can ascend and descend while rotating.

30 designates a filtering substance disposed all over the lower part of vertically cylindrical space 24. The filtering substance 30 forms the bottom of the annular space 24 practically. The fibers dispersed in a dielectric liquid 31 are polarized and oriented, and fiber aggregate 32 is formed on the filtering substance 30 by bridging and sedimentation.

The surface of the positive electrodes 25 is covered with an anion exchange membrane (not shown), and the surface of the negative electrodes 26 is covered with a cation exchange membrane (not shown). The positive electrodes 25 and negative electrodes 26 are connected to a voltage applying apparatus (not shown) for generating a predetermined electric field between the positive electrodes 25 and negative electrodes 26.

A draining means comprising a pipe 33, connectable to a suction apparatus, and a cock 34 is disposed on the bottom of the vessel 21.

In the apparatus illustrated in FIG. 3 and 4, the positive electrode 25 and negative electrode 26 comprises a pair of two needle-shaped cables having the diameter of 2 mm, and are disposed alternately at regular intervals. The total quantity of electrode pairs used is three for each electrode, and the inner diameter of the outer cylinder 22 is 100 mm.

Alumina short fibers (average fiber diameter: 3 $\mu$m, average fiber length: 10 to 5000 $\mu$m) without surface treatment and a very small amount of nonionic surfactant are added to a dielectric fluid comprising carbon tetrachloride. The mixture is stirred to obtain a fiber suspension in which the fibers are dispersed.

An electric field of approximately 1 kv/cm electric field strength is generated among the positive and negative electrodes of the apparatus. The fiber suspension is poured from the top of the annular space 24 into all sections divided by the positive electrodes 25 and negative electrodes 26.

The poured fibers are polarized dielectrically, and oriented in the tangent direction of the circumference electrostatically. Then many of them are bridged, and their masses increase. Then the fibers are sedimented while maintaining the orientation of the tangent direction of the circumference. The positive electrodes 25 and negative electrodes 26 are rotated at the speed of 2 rpm during this operation.

These oriented and bridged fibers are aggregated sequentially on the filtering substance 30 to form the fiber aggregate 32 by draining the filtrate through the pipe 33. The filtrate draining is done simultaneously with the fiber suspension pouring. The positive electrodes 25 and negative electrodes 26 ascend in accordance with the accumulated height of the aggregated fiber layer in order to keep the clearance between the rim of lower end of electrodes and the accumlated fiber layer at a predetermined value. The thread pitch of the support member 27, which engages with the inner cylinder 23 in threaded portion 35, is 2 mm. After the fiber aggregate 32 having a predetermined thickness, approximately 15 mm, is formed, the residual liquid is drained to take out the fiber aggregate 32.

The fiber aggregate 32 has a cylindrical shape, and many of the fibers are oriented in the tangent direction of the circumference satisfactorily. The inner circumference section of the fiber aggregate 32 has a slightly larger fiber volume ratio than that of the outer circumference section of the fiber aggregate 32. However, a fiber aggregate having almost uniform fiber volume ration can be formed by supplying a fiber suspension with a high concentration from the outer circumference area of the annular space 24.

In this preferred embodiment, no turbulent flow due to the fluid draining arises, because the filtering substance 20 is disposed all over the lower part of annular space 24. Thus it is possible to produce a fiber aggregate in which many of fibers are oriented in the tangent direction of the circumference extremely well.

As this fiber aggregate has many of the fibers satisfactorily oriented in the tangent direction of the circumference, the fiber reinforced metal shows greater strength and less thermal expansion when the fiber aggregate is used a fiber reinforced metal. Accordingly, this fiber aggregate is applied, for instance, to various types of pistons effectively.

FOURTH PREFERRED EMBODIMENT

This preferred embodiment has the same arrangement as the third preferred embodiment other than described below:

This preferred embodiment employs two net-shaped positive electrode 25 and two net-shaped negative electrodes 26 disposed at regular intervals, a fluorine and chlorine-substituted hydrocarbon as the dielectric liquid, and silicon carbide whiskers (average fiber diameter: 0.7 $\mu$m, average fiber length: 50 $\mu$m), and an electric field of 105 kv/cm electric field strength. The mesh of the net is #4 class.

A fiber aggregate in which many of the fibers are oriented in the tangent direction of the circumference satisfactorily can also be obtained in this preferred embodiment.

Having now fully described the invention, it will be apparent to one of ordinary skill in the art that many changes and modifications can be made thereto without departing from the spirit or scope of the invention as set forth herein.

What is claimed is:

1. An apparatus for producing a fiber aggregate comprising:
    a vessel having a closed base comprising an inner cylinder and a concentric outer cylinder forming an annular space therebetween;
    a plurality of electrodes, comprising positive electrodes and negative electrodes disposed alternately in the annular space at equal intervals, wherein said electrodes are selected from the group consisting of flat foil electrodes, mesh electrodes, electrodes comprising a plurality of substantially vertical wires disposed in a plane, and a combination thereof;
    means for filtering disposed in the lower part of said annular space;
    means for draining disposed at the base of said vessel; and
    means for applying voltage connected to said electrodes.

2. An apparatus for producing a fiber aggregate according to claim 1, wherein
    said annular space is equally divided into an even number of spaces by said electrodes.

3. An apparatus for producing a fiber aggregate according to claim 1, wherein
    a lower portion of said electrodes are formed of spaced wires.

4. An apparatus for producing a fiber aggregate according to claim 1, wherein said negative electrodes are positioned radially.

5. An apparatus for producing a fiber aggregate according to claim 4, wherein said positive electrodes are positioned radially.

6. An apparatus for producing a fiber aggregate comprising:
- a vessel having a closed base comprising an inner cylinder and a concentric outer cylinder having a central axis and including an annular space therebetween;
- a plurality of electrodes, comprising positive electrodes and negative electrodes disposed alternately in the annular space at equal intervals, wherein said electrodes are selected from the group consisting of foil electrodes, mesh electrodes, electrodes comprising a plurality of substantially vertical wires disposed in a plane, and a combination thereof;
- means for rotating said electrodes around the central axis of said annular space;
- means for filtering disposed in a lower part of said annular space;
- means for raising said electrodes in relation to accumulated height of a layer of aggregated fiber on said filtering means;
- means for draining disposed at the bottom of said vessel; and
- means for applying voltage connected to said electrodes.

7. An apparatus for producing a fiber aggregate according to claim 6, wherein
said annular space is divided into an even number of equal spaces by said electrodes.

8. An apparatus for producing a fiber aggregate according to claim 6, wherein said negative electrodes are positioned radially.

9. An apparatus for producing a fiber aggregate according to claim 8, wherein said positive electrode are positioned radially.

* * * * *